Nov. 14, 1939.  I. C. POPPER  2,179,518
HYDRAULIC TURBINE CLUTCH AND TRANSMISSION
Original Filed Nov. 9, 1933
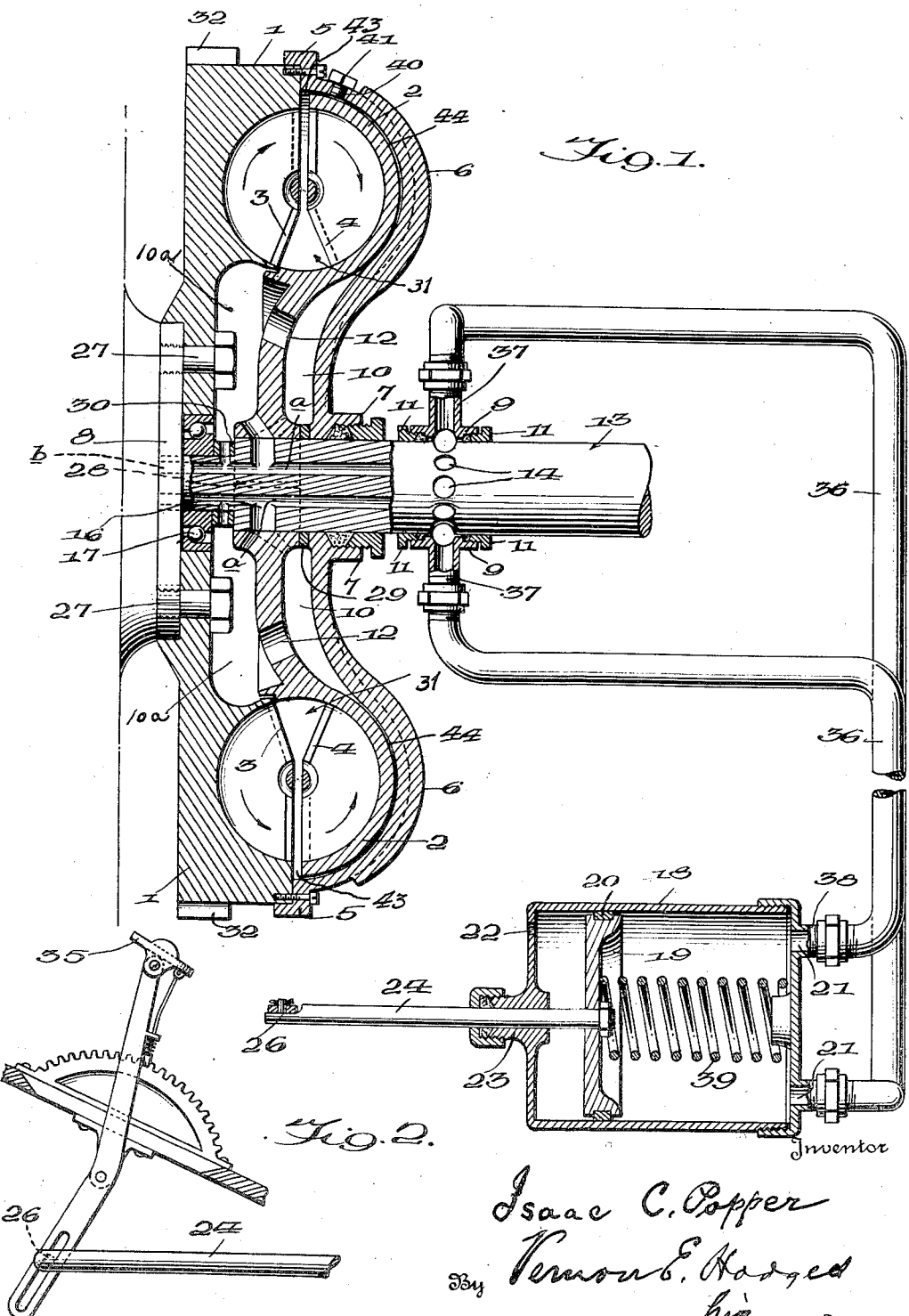
Inventor
Isaac C. Popper
By Vernon E. Hodges
his Attorney Patented Nov. 14, 1939

2,179,518

UNITED STATES PATENT OFFICE 2,179,518

HYDRAULIC TURBINE CLUTCH AND TRANSMISSION

Isaac C. Popper, New York, N. Y., assignor, by mesne assignments, to Automatic Turbine Drive Company, Inc., Providence, R. I., a corporation of New York Application November 9, 1933, Serial No. 697,334
Renewed October 1, 1936

15 Claims. (Cl. 60—54)

My invention relates to an improvement in hydraulic turbine clutches and transmissions.

The principal objects of this invention are to simplify the control of motor torque for various speeds to control power at varying speeds without shifting gears, thereby adding to the life of the vehicle by the prevention of severe shocks from the motor to the driving wheels.

Another object is to reduce the cost of manufacture as my improved invention combines or does the work of the present clutch and transmission all in one at least to some extent.

Another object is to reduce crystallization by preventing jerking or shocking of the automobile, boat, stationary machine, or any other structure to which the invention is applied.

This present invention is a fluid transmission mechanism for power more especially designed for automobiles, although adaptable for many other uses. In the automobile field, it has among others the following advantages: It does away with shift-gears and the shifting of gears for different speeds; it simplifies driving; it eliminates shock in starting; it minimizes wear and tear on the car; it reduces manufacturing cost; it allows for free wheeling at medium speeds but automatically brakes in case of excessive free wheeling speed, especially on down grades in case the brake becomes inoperative.

The foregoing are a few of the advantages, but will serve to illustrate the superiority of this invention over other well-known present types of clutch and transmission now in use.

The ordinary gear-shift is a notoriously objectionable feature in automobiles which has never been satisfactorily eliminated. The present invention does away with it entirely.

In the accompanying drawing:

Fig. 1 is a vertical sectional view through the control device and controlling cylinder, with parts shown in elevation;

Fig. 2 is a detail vertical sectional view showing the control pedal and piston rod in elevation.

The numeral 1 represents the flywheel or driving rotor having the usual peripheral teeth 32 which the starter engages. This flywheel or driving-rotor is secured to the flange 8 of the crank-shaft by means of bolts 27. The outside casing 6 is securely bolted to the flywheel or driving-rotor. A driven rotor 2 is interposed between the fly-wheel or driving-rotor 1 and the casing 6, more or less conforming in shape to the latter, but leaving ample space between the driven rotor 2 and the casing 6 and between the driven rotor 2 and the flywheel or driving-rotor 1 to form fluid chambers 10 and 10a, one or more openings 12 being provided in the rotor 2 to allow fluid to pass between the chambers 10 and 10a or from one side of the driven rotor 2, to the other.

The driven rotor 2 is keyed to the driven-shaft 13.

In the semi-circular spaces between the flywheel or driving-rotor 1 and the driven rotor 2, vanes 3 and 4 are placed, the vanes 3 being secured to the flywheel or driving rotor, and the vanes 4 to the driven rotor. Circumferentially through the center of these vanes 3 and 4 a channel 31 is formed by a divergence of the inner ends of the vanes as shown in Fig. 1, and this channel 31 receives the fluid and discharges it into the buckets between the vanes. The driving and the driven rotors are spaced apart at their inner and outer peripheries, thus providing a fluid inlet passageway 31 at the inner periphery and a fluid outlet passageway 43 at the outer periphery, the fluid outlet passageway 43 leading to the outer narrow portion 44 of the chamber 10. The chamber 10, the chamber 10a, the space between the rotors and the fluid controlling cylinder are thus in free communication at all times.

The driven-shaft 13 has the usual ball-bearing 17 between one end and the flywheel, and an adjustable packing-box 7 is provided in the casing 6 to prevent escape of fluid from the chambers 10 and 10a.

The driven shaft 13 is bored longitudinally a certain distance to form one or more fluid ducts as at a, after which the end b is plugged and one or more holes 16 are provided which extend radially and communicate with the chambers 10 and 10a for the passage of fluid into and out of the chambers 10 and 10a. One or more holes 14 at the inner end of the bores a extend radially of the shaft 13 to the collar 9, which surrounds the shaft 13 and in which the latter turns, adjustable followers 11 being employed to make a fluid-tight joint.

The numeral 18 represents a fluid controlling cylinder of any approved form, and 19 is a piston therein, which has a piston ring 20 for creating a tight fit with the wall of the cylinder. The piston rod 24 extends from the piston through the packing-box 23, and a spring 39 is located inside the cylinder and interposed between the piston and one head of the cylinder, pressing outwardly on each, its function being to create an outward pressure on the piston. At one end of the cylinder, an air vent 22 provides for the free passage of air in and out. The opposite end of the cylinder is filled with fluid.

The action of the piston is controlled in any approved manner, as for instance by the foot-pedal 35, the lower end of which is slotted to receive a pin 26 attached to piston-rod 24, and a ratchet locking device is attached to the pedal to hold the same in a set position.

Pipes 36 extend from the nipples 37 on the collar 9 to the nipples 38 on the head of the cylinder, and through these pipes and the openings 21 in the nipples 38 the fluid passes back and forth between the chambers 10 and 10a and the cylinder 18.

Fluid is replenished through the hole 40, and may be removed at any time through the same hole. A screw-threaded plug 41 closes the hole.

A reverse gear (not shown) of any approved form may be used. Also in applying my improved mechanism it is unnecessary to remove the regular shift gear mechanism. It may be retained or removed. Some manufacturers may prefer to retain the shift-gears since some means for reversing the driven shaft is usually necessary.

As the mechanism is simple, so is the operation. The cylinder and piston act as a pressure variator. When not otherwise resisted by the foot pressure, the piston is moved by the spring 39 in a direction to withdraw some of the fluid from the chambers 10 and 10a. This is done when the engine is idling or the vehicle is slowed down or stopped. To start the vehicle, fluid from the cylinder is forced into the chambers 10 and 10a, and the operator may regulate the speed of the car by the amount of fluid forced into the chambers 10 and 10a. For a gradual start, a slight amount is forced into the chambers 10 and 10a. For a quick pick-up, a larger amount of fluid is forced or pumped into the chambers 10 and 10a; and to attain the highest speed the chambers 10 and 10a are filled to completion, which means the flywheel 1 and the rotor 2 move together through the medium of the fluid trapped between the vanes 3 and 4. In other words, the elements 1 and 2 travel at substantially the same speed when the operator forces the full complement of fluid into the chambers 10 and 10a.

Thus the starting, the pick-up, and speed of the vehicle may be controlled and operated by the one foot-lever after the engine is started and the flywheel commences to turn, and the whole forward motion of the vehicle may be controlled by the amount of fluid in the chambers 10 and 10a, all of which is under the control of the operator.

When the vehicle is standing still, the piston 19 will have been moved to the outer end of its stroke, thus having drawn the major portion of the fluid into the cylinder 18. When starting, the operator feeds the gas to the engine in the usual way, and presses on the control pedal 35, forcing fluid out of the cylinder through the pipes 36, the bores a of the shaft 13, and thence into the fluid chambers 10 and 10a. As soon as fluid enters the chambers, motion will be smoothly transmitted without a jerk from the driving to the driven part of the mechanism.

In order to speed up the vehicle, the operator naturally feeds more gas and simultaneously forces more fluid into the chambers until the speed of the elements 1 and 2 becomes substantially the same.

Thus I am able to dispense with the use of the ordinary clutch as well as the gear-shift mechanism since my improved mechanism combines and does away to some extent at least with the work of the present clutch and transmission.

The mechanism hereinbefore described is supposed to be typical and more or less illustrative, but I do not care to have it understood by any means that it is the only form my invention may take, as I desire to be fully protected in all modified forms that would come within the scope of the invention and the claims.

I claim:

1. Mechanism of the character described including a driving and a driven rotor having means forming a hydraulic coupling therebetween, a driven shaft to which the driven rotor is connected, a casing secured to the driving rotor and enclosing the driven rotor and forming a fluid chamber between said casing and the driven rotor, the driven rotor having openings to allow the passage of fluid from one side thereof to the other, a cylinder in communication with the fluid chamber, a piston fitted to the cylinder, a spring exerting pressure between the piston and one end of the cylinder tending to move the piston in a direction to withdraw fluid from the chamber, a piston rod, and a lever connected with the piston rod to move the piston in the opposite direction whereby pressure of the fluid in the cylinder and fluid chamber is manually controlled by the lever.

2. Mechanism of the character described including a driving and a driven rotor having means forming a hydraulic coupling therebetween, a driven shaft to which the driven rotor is connected, a casing secured to the driving rotor and enclosing the driven rotor and forming a fluid chamber between said casing and the driven rotor, the driven rotor having openings to allow the passage of fluid from one side thereof to the other, a cylinder in communication with the fluid chamber through the driven shaft, a piston fitted to the cylinder, a spring within the cylinder exerting pressure between the piston and one end of the cylinder tending to move the piston in a direction to withdraw fluid from the chamber, a piston rod, and a lever connected with the piston rod to move the piston in the opposite direction, whereby pressure of the fluid in the cylinder and fluid chamber is manually controlled by the lever.

3. Mechanism of the character described including a driving and a driven rotor having means forming a hydraulic coupling therebetween, a driven shaft to which the driven rotor is connected, a casing secured to the driving rotor and enclosing the driven rotor and forming a fluid chamber between said casing and the driven rotor, the driven rotor having openings to allow the passage of fluid from one side thereof to the other, a cylinder in communication with the fluid chamber, a piston fitted to the cylinder, a spring within the cylinder exerting pressure between the piston and one end of the cylinder tending to move the piston in a direction to withdraw fluid from the chamber, a piston rod, a lever connected with the piston rod to move the piston in the opposite direction whereby pressure of the fluid in the cylinder and fluid chamber is manually controlled by the lever, the lever having a loose connection with the piston rod, a foot pedal connected with the lever, and means connected with the foot pedal for locking the lever to maintain and hold the pressure within the fluid chamber.

4. In a hydraulic power transmission, the combination with driving and driven members, of driving and driven rotors connected respectively with said driving and driven members and having a hydraulic coupling therebetween for the transmission of power, a casing attached to the driving rotor and enclosing the driven rotor, said driven rotor dividing the space between the driving rotor and casing into chambers which communicate with each other through at least one opening through the driven rotor, one of said chambers having communication around the driven rotor with the space between the rotors, and means for supplying liquid through the driven member from externally of said transmission directly to the other of said chambers.

5. In a hydraulic power transmission, the combination with driving and driven members, of driving and driven rotors connected respectively with said driving and driven members and having a hydraulic coupling therebetween for the transmission of power, a casing attached to the driving rotor and enclosing the driven rotor, said driven rotor having a perforated radial web dividing the space between the driving rotor and casing into chambers which communicate through said web, one of said chambers having communication around the driven rotor with the space between the rotors, the driven member having an internal supply bore communicating directly with the other of said chambers and having a liquid supply connection externally of said transmission.

6. In a hydraulic power transmission, the combination with a driving member and a driven shaft, of driving and driven rotors connected respectively with said driving member and driven shaft, and having cooperating vanes in opposing sides thereof, a casing attached to the driving rotor and enclosing the driven rotor, said driven rotor having a perforated web dividing the space between the driving rotor and casing into chambers which communicate through said web, one of said chambers having communication around the driven rotor with the space between the rotors, the driven shaft having longitudinal and radial bores therein extending directly to the other of said chambers, and means externally of said transmission for supplying liquid to said bores.

7. In a hydraulic power transmission, the combination of a driving rotor, a driven rotor, a casing forming a fluid chamber between said casing and the driven rotor, a cylinder having means of communication with the fluid chamber, a piston in the cylinder, resilient means within the cylinder bearing against the piston in a direction tending to move the piston for withdrawal of fluid from the chamber, and a piston rod connected with the piston and arranged to move the piston in the opposite direction.

8. In a hydraulic power transmission, the combination of a driving rotor, a driven rotor, a casing forming a fluid chamber between said casing and the driven rotor, a cylinder having means of communication with the fluid chamber, a piston in the cylinder, resilient means within the cylinder bearing against the piston in a direction tending to move the piston for withdrawal of fluid from the chamber, a piston rod connected with the piston and arranged to move the piston in the opposite direction, and a lever connected with the piston rod for actuating the piston whereby pressure of the fluid in the fluid chamber is manually controlled.

9. In a hydraulic power transmission, the combination of a driving rotor, a driven rotor, a casing forming a fluid chamber between said casing and the driven rotor, a cylinder having means of communication with the fluid chamber, a piston in the cylinder, resilient means in the cylinder bearing against the piston in one direction, and a piston-rod connected with the piston and extending therefrom in the opposite direction from the resilient means, said piston rod extending through an end of the cylinder in position for manual actuation of the piston against the pressure of the resilient means.

10. In a hydraulic power transmission, the combination of driving and driven rotors having a hydraulic coupling therebetween, a casing connected with the driving rotor and enclosing the driven rotor, a shaft connected with one of said rotors, said driven rotor having means dividing the space in the casing into chambers which communicate directly with each other within the transmission, and pressure means for supplying fluid through the shaft from externally of said transmission to at least one of said chambers, at the axes of the rotors.

11. In a hydraulic power transmission, the combination of driving and driven rotors having a hydraulic coupling therebetween and having radially spaced inner and outer rims which are spaced apart to provide flow passages between the inner rims and the outer rims thereof, a casing about at least one of said rotors and forming an unobstructed fluid chamber therearound from hub to periphery, means of communication from said fluid chamber directly with the flow passages between the inner and outer rims of the rotors, and means for supplying liquid from externally of the transmission into the transmission at a point adjacent the axis of rotation of the rotors.

12. In a hydraulic power transmission, the combination of a driving rotor, a driven rotor, a casing forming a fluid chamber between said casing and the driven rotor, a cylinder having means of communication with the fluid chamber and having a capacity not less than 20% of the chamber capacity, a piston in the cylinder, resilient means in the cylinder bearing against the piston in one direction, and a piston-rod connected with the piston and extending therefrom in the opposite direction from the resilient means, said piston rod extending through an end of the cylinder in position for manual actuation of the piston against the pressure of the resilient means.

13. The combination of a driven shaft, driving and driven rotors concentric therewith, said rotors having cooperating opposed radial vanes forming a fluid chamber therebetween, a casing enclosing the rotors and forming a second fluid chamber between said casing and one rotor, a fluid inlet to said rotor fluid chamber between said rotors, and ducts respectively connecting said rotor fluid chamber peripherally with said second fluid chamber and said second fluid chamber with said fluid inlet.

14. The combination of a driven shaft, driving and driven rotors concentric therewith, said rotors having cooperating opposed radial vanes forming a fluid chamber therebetween, a casing enclosing the rotors and forming a second fluid chamber between said casing and one rotor, a fluid inlet to said rotor fluid chamber between said rotors, a pressure fluid reservoir in free communication with said fluid inlet, and ducts respectively connecting said rotor fluid chamber peripherally with said second fluid chamber and said second fluid chamber with said fluid inlet.

15. The combination of a driven shaft, driving and driven rotors concentric therewith and forming a fluid chamber therebetween, means for enclosing the rotors and forming an external fluid chamber between said means and one of the rotors, said fluid chambers freely communicating, the rotors having opposed, cooperating, radial vanes which create a flow of fluid in the fluid chamber between the rotors and the external fluid chamber, said rotors being spaced adjacent the shaft to provide a fluid inlet, and a pressure reservoir for fluid in constant communication with the said inlet.

ISAAC C. POPPER.